United States Patent [19]

Schecter

[11] 4,320,004
[45] Mar. 16, 1982

[54] ANTI-RUST WATER TREATMENT APPARATUS

[76] Inventor: Rubin Schecter, 4811 NE. 12th Ave., Oakland Park, Fla. 33334

[21] Appl. No.: 951,474

[22] Filed: Oct. 16, 1978

[51] Int. Cl.³ ..................... B01D 23/24; B01D 27/12
[52] U.S. Cl. .................................. 210/266; 210/275; 210/282; 210/289
[58] Field of Search ................ 210/38 B, 80, 82, 232, 210/263, 266, 269, 275, 282, 333 R, 411, 289, 291; 252/455 Z

[56] References Cited

U.S. PATENT DOCUMENTS

| | | | |
|---|---|---|---|
| 2,167,225 | 7/1939 | Van Eweyk | 210/266 X |
| 3,101,316 | 8/1963 | Rose | 210/38 B |
| 3,763,879 | 10/1973 | Jaworek | 210/282 X |
| 3,951,811 | 4/1976 | Casolo | 210/282 X |

Primary Examiner—Ernest G. Therkorn
Attorney, Agent, or Firm—Oltman and Flynn

[57] ABSTRACT

For removing iron from water the present apparatus has a bed of manganese zeolite particles above an outlet screen unit and below an inlet screen unit in a container. The container has enough empty space above the treatment bed to permit substantially all of its particles to be tumbled vigorously during backwash for effective removal of the accumulated iron and other impurities trapped in the treatment bed. Each screen unit includes a pair of split rings which hold foraminous screens between them and are radially contractable for slidable insertion in the container, after which they expand radially for a tight fit inside the container. Cross bars on each split ring reinforce the screens.

3 Claims, 4 Drawing Figures

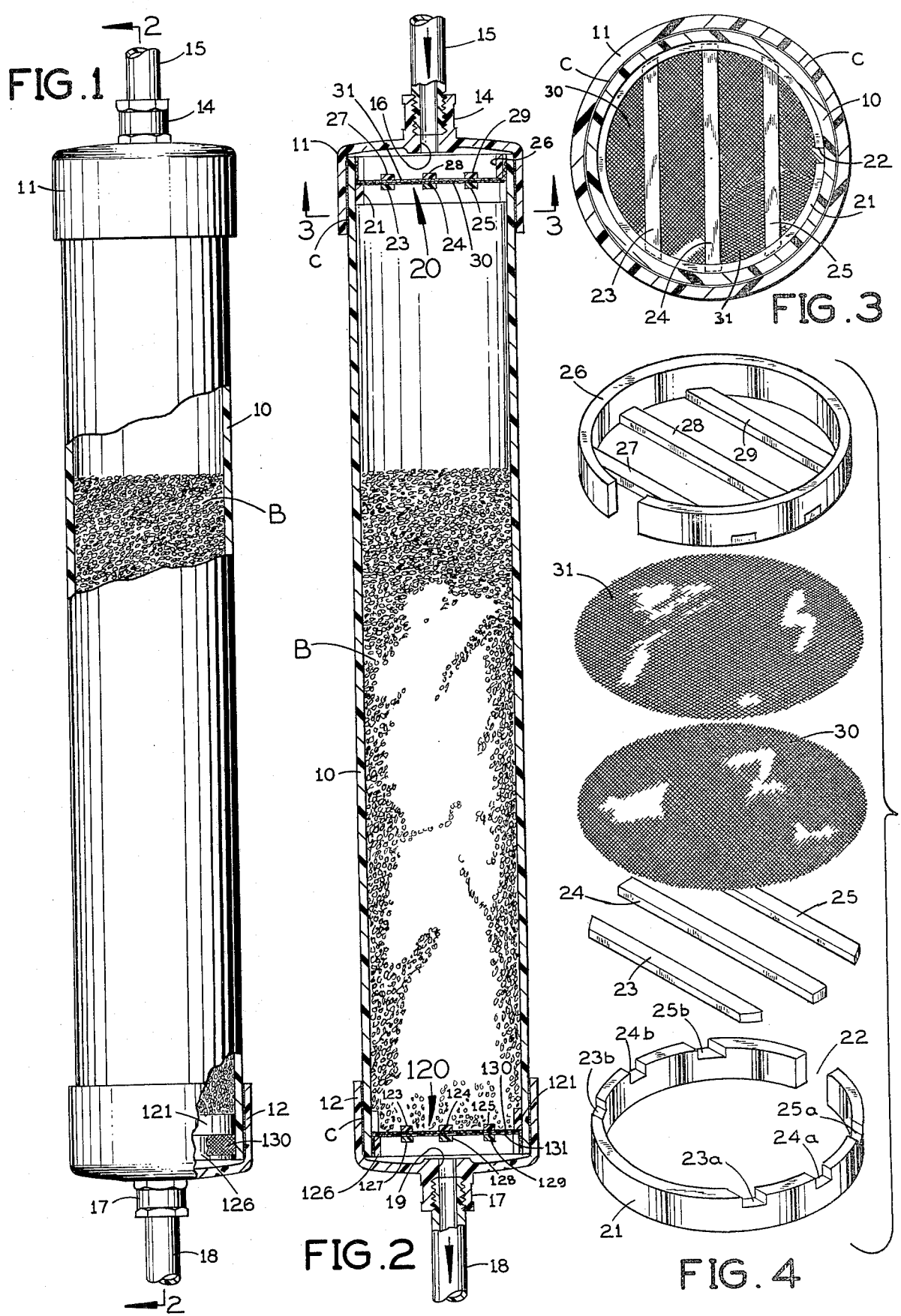

ANTI-RUST WATER TREATMENT APPARATUS

BACKGROUND OF THE INVENTION

In some areas of the United States well water contains appreciable iron which produces rust stains on buildings, side-walks and streets when used in lawn sprinkler systems. This is a longstanding problem in South Florida, where the water table is high and it is relatively economical for a property owner to use a shallow well pumping system for supplying the water needed to sprinkle the lawn. This economic advantage is offset for many property owners by the staining problem, so that in many cases "city water" is used for lawn sprinkling as well as in the house or other building. (The term "city water" is used herein to describe the water supplied to buildings by a municipality, county or private utility operating under the authority of the state Public Service Commission or similar public body.)

City water in many cases is relatively expensive because it has been treated to make it suitable for human ingestion, and sometimes for washing purposes, so as to eliminate impurities which are of no great consequence in lawn sprinkling. In coastal areas, excessive use of city water can threaten the city water supply with salt water intrusion, so that from an ecological standpoint it would be very advantageous to induce residents to stop using city water for lawn sprinkling purposes.

SUMMARY OF THE INVENTION

The present invention relates to a water treatment apparatus which uses a bed of manganese zeolite particles to remove iron from the supply water. The treatment bed is in a confined space which is at least one-third empty, enabling the entire treatment bed to be tumbled vigorously throughout this confined space when it is backwashed, which typically must be done relatively frequently to remove from the treatment bed the accumulated rust and other impurities which it has previously removed from the supply water.

Preferably, the container is a tank having a supply water inlet at the top, an inlet screen unit just below the water inlet, a water outlet at the bottom, and an outlet screen unit a short distance above the water outlet and supporting the bed of manganese zeolite particles from below. The sidewall of the container and the outlet and inlet screen units together define the confined space which has enough empty space above the treatment bed to enable substantially all the manganese zeolite particles to be tumbled vigorously during backwash.

The principal object of this invention is to provide a novel and improved water treatment apparatus for removing iron from the supply water.

Another object of this invention is to provide such a water treatment apparatus which uses a particulate bed of manganese zeolite to remove the iron.

Another object of this invention is to provide a novel water treatment apparatus in which a bed of manganese zeolite particles can be effectively backwashed when necessary to remove from it the accumulated iron and other impurities which it has removed from the supply water.

Further objects and advantages of this invention will be apparent from the following detailed description of a presently-preferred embodiment thereof, which is shown in the accompanying drawings in which:

FIG. 1 is an elevational view of the present water treatment apparatus with parts broken away for clarity;

FIG. 2 is a vertical section taken longitudinally along the centerline 2—2 in FIG. 1;

FIG. 3 is a horizontal cross-section taken along the line 3—3 in FIG. 1 below the inlet screen unit; and FIG. 4 is an exploded perspective view of the inlet screen unit in this apparatus.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

Referring to FIGS. 1 and 2, the presently-preferred embodiment of this apparatus comprises a three-piece container or housing having a vertically elongated open-ended cylinder 10, an inverted cup-shaped cap 11 at the top, and a cup-shaped base 12 at the bottom. These parts may be of rigid polyvinyl chloride and they may be assembled to each other in water-tight fashion by a suitable cement, as shown at C in FIG. 2.

The top cap 11 has an upwardly projecting, centrally located, internally screw-threaded, generally cylindrical nipple 14 which threadedly receives the externally screw-threaded lower end of a water supply pipe 15 connected to a pressurized source of untreated water, such as well water. Below the nipple 14 the top wall of the cap 11 has a vertical inlet opening 16 (FIG. 2) for passing the supply water down into the cylindrical interior of the container.

Similarly, the base 12 has a downwardly projecting, central, internally screw-threaded, generally cylindrical nipple 17 which threadedly receives the externally screw-threaded upper end of an outlet pipe 18. The bottom wall of the base has a central vertical outlet opening 19 for passing water from the lower end of the container down into the outlet pipe 18.

In accordance with one feature of the present invention, a novel screen unit 20 is provided inside the cylinder 10 at the latter's upper end and a similar screen unit 120 is provided at the lower end. The upper screen unit 20 will be referred to as the inlet screen unit, and the lower screen unit 120 will be referred to as the outlet screen unit.

The inlet screen unit 20 comprises a lower split ring 21 having a longitudinal slit or gap at 22. This split ring is made of a suitable plastic material and is sufficiently flexible and resilient to be compressed radially from its normal expanded state, as shown in FIG. 4, to a smaller size in which the slit or gap 22 is partially closed and the split ring can be slidably inserted into the cylinder 10, after which it expands again into tight engagement with the cylinder wall.

The lower split ring 21 carries three horizontal cross bars 23, 24 and 25, which extend transversely across the ring as best seen in FIG. 3. The opposite ends of these bars are snugly but slidably received in slots 23a–23b, 24a–24b and 25a–25b formed in the top of the split ring 21 on opposite sides, as shown in FIG. 4. This sliding fit permits the split ring 21 to be radially contracted or to expand while the cross bars 23–25 are seated in these slots.

The inlet screen unit 20 also has an upper split ring 26 which is substantially a mirror image of the lower split ring 21 and is made of the same material. This upper ring carries three cross bars 27, 28 and 29 on the bottom, as shown in FIG. 4.

Two initially flat, foraminous screens 30 and 31 of fiberglass or other suitable non-reactive material are sandwiched between the lower split ring 21 and its cross bars 23, 24, 25 and the upper split ring 26 and its cross bars 27, 28, 29. As shown in FIG. 3, the bottom screen 30 is engaged from below by the cross bars 23–25 on the lower split ring 21 and the top screen 31 is engaged from above by the cross bars 27–29 on the upper split ring 26. At their peripheries the two contiguous screens 30 and 31 are formed into annular skirts which extend up around the outside of the upper split ring 26 and are tightly gripped between the outside of this ring and the inside of the cylinder 10 because of the inherent tendency of the upper ring 26 to expand radially outward. In one practical embodiment each screen may have a 12×40 mesh size.

A similar outlet screen unit 120 is provided in the lower end of the cylinder 10 above the bottom wall of the base 12. This screen unit is a mirror image of the inlet screen unit 20, and corresponding elements of it are given the same reference numerals, plus 100, as those of the inlet screen unit.

It is to be understood that only a single foraminous screen, or more than two, may be provided in either or both of the inlet and outlet screen units 20 and 120.

In accordance with the present invention, immediately above the outlet screen unit 120 the apparatus contains a treatment bed B of manganese zeolite particles. This particulate material is sold under the name "birm", and it comprises manganese ore bonded onto an inert center core of nonhydrous aluminum silicate. I have discovered that this material is highly effective in removing iron from water by causing the iron to precipitate out of solution in the water.

I have also discovered that after a prior of use this treatment bed tends to become clogged with iron and other impurities enough to seriously reduce the water pressure at the outlet. To get rid of these accumulated trapped impurities requires that the treatment bed be backwashed vigorously by introducing water under pressure below the bed at the outlet opening 19 and discharging the backwash from above the bed through the inlet opening 16. However, I have discovered that effective backwashing can be carried out only if the container has an appreciably normally empty space between the top of the treatment bed and the inlet screen unit 20, which leaves room enough for substantially all the particles in the bed to be tumbled vigorously during backwash. These particles are relatively small and densely packed during the normal water treatment phase of operation of the apparatus.

Effective backwashing cannot be achieved if the treatment bed is closely confined at each end within the container, in which case the volume which the treatment bed occupies during backwash could be only substantially as much as the volume it occupies during the normal water treatment phase of its use.

The empty space between the treatment bed B and the inlet screen must be at least one-third, and preferably not more than one-half, the total volume of the confined space inside the cylinder 10 between the outlet screen unit 120 and the inlet screen unit 20. Therefore, not more than two-thirds, and preferably not less than one-half, of this confined space is occupied by the treatment bed B during the normal water treatment operation.

In one practical embodiment, the total length of the container (including the end caps) is 48 inches, its outside diameter (at the end caps) is 7 inches, and the vertical depth of the treatment bed is 30 or 31 inches.

The effectiveness of the backwashing is enhanced by virtue of the spacing of the superimposed screens 130, 131 in the bottom screen unit 120 above the bottom wall of the base 12 of the container. This insures that all the cross-sectional area of the treatment bed B at the bottom will be exposed to the incoming backwash water and that substantially all of the particles in the filter bed will be subjected to the backwash water as it flows up through the cylinder 10 across the entire interior cross-section of the latter.

Where the water is to be ingested by humans, particles of activated charcoal may be mixed in with the manganese zeolite in the treatment bed. Preferably, not more than 25% (by volume) of the treatment bed should be activated charcoal.

I claim:
1. An anti-rust water treatment apparatus for removing iron from water comprising:

a container having a water inlet, a water outlet spaced from said inlet, and support means confining a treatment bed between said inlet and outlet in a predetermined space inside said container;

said treatment bed comprising manganese zeolite particles occupying not more than two-thirds of said predetermined confined space and not less than one-half of said predetermined confined space, with the remainder of said predetermined confined space inside the container being empty to enable substantially all of the manganese zeolite particles to be tumbled vigorously in the container by backwashing with water under pressure which is introduced in the container at said outlet and discharged from the container at said inlet;

said support means for confining said treatment bed comprising an inlet screen unit in the container between said water inlet and said bed of manganese zeolite particles spaced above said treatment bed, and an outlet screen unit in the container between said bed of manganese zeolite particles and said water outlet and supporting said treatment bed from below;

each of said screen units including a foraminous screen means exposed for substantially more than 50% of the cross-sectional extent of the treatment bed so that nearly all of the treatment bed is exposed to backwash water introduced into the container at said outlet and flowing up through said foraminous screen means, and a pair of resilient split rings in axially confronting relationship to each other and each being radially compressible for slidable insertion into the container and radially expandable after such insertion for a tight fit in the container, said foraminous screen means being clamped between said rings and extending transversely across the interior of the container;

each of said split rings having circumferentially spaced slots which are open at the side of the respective ring which faces toward said foraminous screen means;

and cross bars slidably received in said slots and engaging the foraminous screen means to physically reinforce the latter on both sides thereof, said cross bars of each ring being substantially spaced from each other laterally of said ring so that substantially more than 50% of the area of said screen means is exposed for passing water to the treatment bed both during filtering and during backwash.

2. The anti-rust water treatment apparatus as claimed in claim 1 in which:

each of said screen means has an annular skirt clamped between the periphery of one of said split rings and the wall of the container.

3. The anti-rust water treatment apparatus as claimed in claim 1 in which:

each of said screen means includes at least two separate screens clamped between a pair of said split rings.

* * * * *